UNITED STATES PATENT OFFICE.

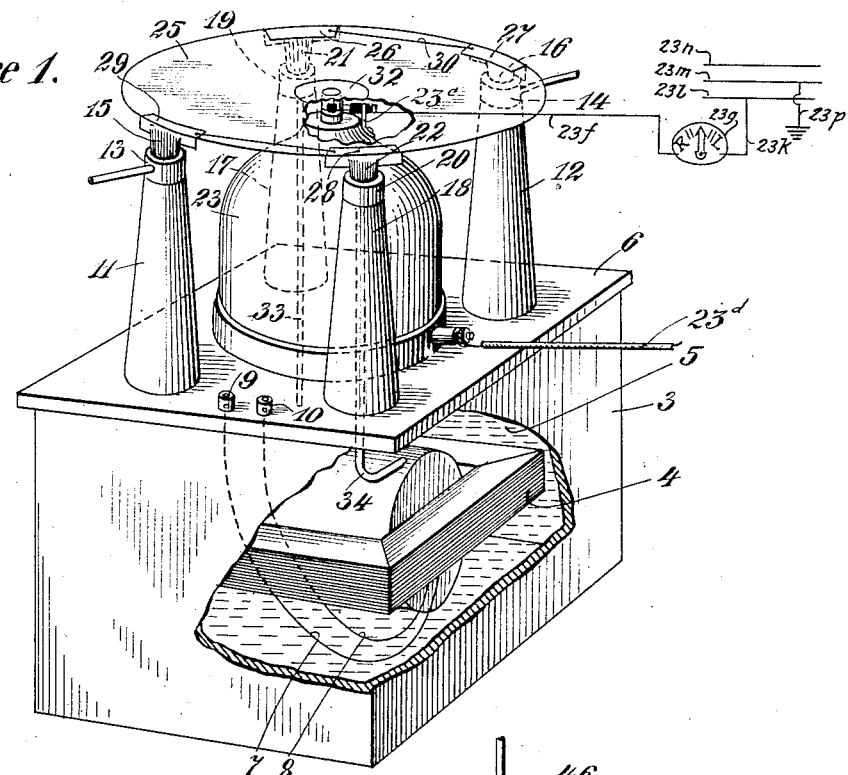

REINHOLD H. WAPPLER, OF YONKERS, NEW YORK, ASSIGNOR TO WAPPLER ELECTRIC COMPANY, INC., A CORPORATION OF NEW YORK.

HIGH-POTENTIAL ELECTRIC MACHINE.

1,371,404.  Specification of Letters Patent.  Patented Mar. 15, 1921.

Application filed June 26, 1918. Serial No. 242,062.

*To all whom it may concern:*

Be it known that I, REINHOLD H. WAPPLER, a citizen of the United States, residing at Yonkers, in the county of Westchester and State of New York, have invented certain new and useful Improvements in High-Potential Electric Machines, of which the following is a full, clear, and exact description.

My invention relates to high potential electric machines of composite type, that is, made up of several distinct mechanisms and comprising, usually, a high tension transformer mounted in a casing and enveloped in a mass of liquid or solid insulating material, a high tension rectifying switch for rectifying the secondary currents from the transformer, and a synchronous motor for actuating the rectifying switch—the parts being so related that the rectifying switch is driven in synchronism with phases of the alternating current used for energizing the motor.

More particularly stated, I seek to accomplish the following results:

I. To enable some particular portion of the transformer casing, preferably the cover, to serve as a base for both the synchronous motor and the rectifying switch.

II. To give the rectifying switch such form and arrangement that it may be built around the motor, thus promoting compactness.

III. To so group the various parts as to promote simplicity, compactness, accessibility and low cost of production in the machine as a whole.

Reference is made to the accompanying drawing forming a part of this specification, and in which like reference characters indicate like parts throughout the figures.

Figure 1 is a perspective showing one form of my device, certain parts being broken away.

Fig. 2 is a perspective of another form of my device, certain parts being broken away.

Fig. 3 is a fragmentary perspective of certain parts common to both forms.

A casing is shown at 3, and may be considered a tank, vat or box, as the case may be. It contains a mass of insulating material 5, which may be liquid, plastic or solid, as desired.

Mounted within the casing 3, and enveloped in the mass of insulating material 5, is a high tension transformer 4. The casing is provided with a flat plate 6, serving as a cover for the casing and also as a base for supporting various parts.

Connected with the transformer 4 are a pair of conductors 7, 8, which lead to binding posts 9, 10, mounted upon the plate 6, and used in connection with low tension currents for energizing the transformer.

Mounted rigidly upon the plate 6 are a pair of posts 11, 12 of insulating material, each having the form of a pillar, and mounted upon these posts are a pair of high tension terminals 13, 14, provided with wire brushes 15, 16.

Two other posts 17, 18 are mounted rigidly upon the plate 6, and are provided with terminals 19, 20, carrying brushes 21, 22. The posts 17, 18 each have the form of a tubular pillar, whereas the posts 11, 12 are each preferably solid throughout.

The four posts are spaced equidistant, and located adjacent the respective corners of the plate 6, which has a rectangular form.

A synchronous motor 23 is mounted upon the top of the plate 6, and disposed centrally thereof, so as to be surrounded by the four pillars 11, 12, 17, 18. This motor is provided with an armature shaft 24, extending vertically. The shaft has upon its upper end a rectifying disk 25, carrying sectors 26, 27, 28, 29, these being connected in pairs by conductors 30, 31, in the usual or any desired manner. A reinforcing ring 32 strengthens the disk 25, in its mounting upon the shaft.

Two conductors 33, 34 are connected to the transformer, and extend therefrom through the tubular pillars 17, 18 to the high tension terminals 19, 20.

The armature shaft 24 carries a commutator 23$^a$, and engaging this commutator is a brush 23$^b$, supported upon a post 23$^c$, the latter being mounted upon the frame of the casing of the motor 23.

A ground wire 23$^d$ is connected to the motor frame. This ground wire serves not only the general purpose of a ground wire, but in addition serves for discharging any static charge to ground and to prevent a breakdown of insulation from the frame of the motor to the windings through the static leakage.

A wire 23$^f$ leads from the brush 23$^b$ to a polarity indicating meter 23ᵍ, of the permanent magnet type. A wire 23ᵏ leads from this meter to a main 23ˡ. This main and two others 23ᵐ and 23ⁿ, are the alternating current mains from which the operating current is drawn. This is merely the well known manner of obtaining single phased current, in instances where polyphase mains are used. The main 23ᵐ is grounded at 23ᵖ.

As the armature shaft 24 turns, the commutator 23ᵃ intermittently connects to ground the brush 23ᵇ from which a circuit is made through a permanent magnet type polarity indicating meter to a live wire. When the motor is in synchronism the contact device will indicate the polarity of the curent at the high tension terminals and will also disclose if the protecting ground wire 23ᵈ has been properly connected or not. A circuit may be traced as follows: main 23ˡ, wire 23ᵏ, meter 23ᵍ, wire 23ᶠ, brush 23ᵇ, through commutator 23ᵃ, and motor to ground wire 23ᵈ, thence to ground and ground wire 23ᵖ, main 23ᵐ to power house and thence back to main 23ˡ. In case the wire 23ᵈ is not properly connected the indicator fails to register and thus gives an indication of a fault.

In the form shown in Fig. 2, two posts 35, 36 are made of sheet metal, so bent as to form feet 37, 38, which are secured upon the plate 6. The posts 35, 36 are also provided at their upper ends with bent portions 39, 40, and supported by the latter are brush cups 41, 42, carrying brushes 43, 44, and also high tension terminals 45, 46.

The high tension rectified currents are taken from the terminals 13, 14 of Fig. 1, or from the terminals 45, 46 of Fig. 2.

Except as above indicated, the structure and action of the form of my invention appearing in Fig. 2 is identical with that shown in Fig. 1.

Generally speaking, the electrical action of my device is identical with that of other high tension electric machines heretofore used in X-ray work, for instance the machine described in patent of May 21, 1918, No. 1,266,931 to Charles Fayer or that disclosed in my own patent of May 16, 1911, No. 992,302.

It will be noted that in each form of my present invention the various mechanisms are arranged very compactly. The plate 6 serves as a cover for the casing, and also as a base for the rectifying switch as a whole. The rectifying disk, as is usual in high tension machines of this general character, has a diameter greater than that of the motor, so that the edge of the disk overhangs the post 23ᶜ and the outermost portions of the motor.

The grouping of the posts around the motor is so arranged that the posts occupy space which would otherwise be useless, and by mounting the post 23ᶜ upon the motor casing, the commutator mechanism virtually occupies no room whatever.

It follows that the rectifying switch as a whole occupies, even while in action, no more space than it would if the motor was absent altogether.

Again, since the plate 6 acts as the base of the rectifying switch as well as the cover for the casing 3, the number of parts necessary is reduced and thus a still further saving of space is effected.

The net result is an exceedingly compact and simple machine, in which all parts are readily accessible for purposes of inspection, removal and replacement, and which can be produced at a relatively low cost.

I claim:

1. The combination of a supporting plate, a synchronous motor mounted thereupon and provided with a motor frame and with an armature shaft extending from said motor frame, a commutator carried by said shaft, a brush engaging said commutator, a post mounted upon said motor frame and supporting said brush, and a rectifying switch mounted upon said supporting plate and built around said post and said motor frame.

2. The combination of a receptacle, a body of insulating material contained therein, a transformer located within said receptacle and enveloped within said body of insulating material, a cover for said receptacle, a synchronous motor mounted upon said cover and provided with a shaft extending laterally therefrom, a rectifying disk mounted upon the end of said shaft, a commutator carried by said shaft, a brush engaging said commutator, and a post carrying said brush and mounted upon the framework of said motor, said post, said brush and said commutator being located between said rectifying disk and said cover of said receptacle.

3. The combination of a receptacle, a body of insulating material contained therein, a transformer located within said receptacle and enveloped within said body of insulating material, a flat cover for said receptacle, a synchronous motor mounted upon said cover and provided with a shaft extending laterally therefrom, a rectifying disk mounted upon the end of said shaft and located parallel with said flat cover, a commutator mounted upon said shaft and located between said rectifying disk and said motor, a brush engaging said commutator, and a post mounted upon the framework of said motor and supporting said brush.

4. The combination of a receptacle, a body of insulating material contained therein, a transformer located within said receptacle and enveloped within said body of insulating material, a flat cover for said receptacle, a synchronous motor mounted upon said cover and provided with a shaft extending laterally therefrom, a rectifying disk mounted upon the end of said shaft and located parallel with said flat cover, posts carried by said cover and distributed about said motor, terminals mounted upon said posts, contact members mounted upon said posts, contact sectors carried by said rectifying disk and coacting with said contact members mounted upon said posts.

5. The combination of a receptacle provided with a flat supporting portion, a body of insulating material contained within said receptacle, a transformer enveloped within said body of insulating material, a synchronous motor mounted upon said flat supporting portion and provided with a shaft extending away from said receptacle, a rectifying disk mounted upon said shaft, a pair of tubular posts of insulating material mounted upon said wall and located upon opposite sides of said motor, contact members mounted upon said posts, conductors extending from said contact members through said tubular posts to said transformer, a second pair of posts, a pair of terminals mounted thereupon, said contact mechanism mounted upon all of said posts and coacting with said rectifying disk for the purpose of rectifying high tension currents.

REINHOLD H. WAPPLER.